United States Patent [19]
Une et al.

[11] Patent Number: 5,988,888
[45] Date of Patent: Nov. 23, 1999

[54] SQUEEZE FILM DAMPER BEARING

[75] Inventors: Soichiro Une, Odawara; Osamu Saito, Matsudo; Shinobu Saito, Chiba; Masao Kobayashi, Shiki, all of Japan

[73] Assignee: Ishikawajima-Harima Jukogyo Kabushiki Kaisha, Tokyo-to, Japan

[21] Appl. No.: 09/089,160

[22] Filed: Jun. 2, 1998

[30] Foreign Application Priority Data

Jun. 10, 1997 [JP] Japan .................................. 9-152073

[51] Int. Cl.⁶ ............................................. F16C 32/06
[52] U.S. Cl. .................................... 384/119; 384/120
[58] Field of Search ............................ 384/119, 120, 384/106, 114, 107

[56] References Cited

U.S. PATENT DOCUMENTS 5,116,143  5/1992  Saville et al. ............................ 384/106
5,902,049  5/1999  Heshmat .................................. 384/106

FOREIGN PATENT DOCUMENTS 8-261231  10/1996  Japan .

Primary Examiner—Lenard A. Footland
Attorney, Agent, or Firm—Oblon, Spivak, McClelland, Maier & Neustadt, P.C.

[57] ABSTRACT

A squeeze film damper bearing comprises a bearing metal 2 for supporting a rotation shaft 1, a bearing casing 3 for covering the bearing metal 2 and a concentricity spring 4 between the bearing metal 2 and the bearing casing 3. The bearing casing 3 is provided at its inner periphery with a circumferential groove 3a for accommodating the spring. The spring 4 is made of an elongate steel sheet 4a and has a plurality of recesses 4b formed on a surface of the steel sheet 4a to provide a plurality of longitudinally aligned projections 4c on the other surface of the steel sheet. The steel sheet is bent into cylindrical shape. Each of the projections 4c has a curved surface with a generating line in parallel with the rotation shaft 1.

2 Claims, 3 Drawing Sheets

SQUEEZE FILM DAMPER BEARING

BACKGROUND OF THE INVENTION

The present invention relates to a bearing for supporting a high-speed rotation shaft of, for example, a centrifugal compressor, and in particular relates to a squeeze film damper bearing.

In general, a squeeze film damper bearing is a bearing of a type such that fluid film is formed between a fixed surface and the bearing for support of a rotation shaft, thereby supporting the bearing by fluid film pressure. The bearing is particularly characterized by its effect of decreasing any vibration of the shaft being rotated at high speed, and is much useful as a bearing for a turbocompresser, a turbocharger or the like.

A typical example of such squeeze film damper bearing is disclosed in JP-A-58-109718 wherein an oil film is formed by supplying oil into a gap between a fixed support surface and an outer ring presser of a roller bearing. The presser is supported by a number of bolts which extend in parallel with the shaft and enclose the shaft from the fixed side, these bolts serving as spring means. In this way, the bearing is supported by the spring means and by the oil film provided in parallel with the spring means to thereby provide the squeeze film damper bearing.

However, the bearing with the above-mentioned structure is difficult to assemble with higher accuracy and therefore is much expensive. It also requires axially much space and therefore is hardly applicable in a small-sized rotating machine which is limited in space. Japanese Patent Application No. 7-60683 (JP-A-8-261231) was filed by the owner of the present application to overcome this problem.

The bearing disclosed in JP-A-8-261231 comprises a bearing metal for supporting a rotation shaft, a bearing casing for covering the bearing metal, and highly rigid concentricity spring means in the form of arcuate members between the bearing metal and the bearing casing. The bearing metal is stepped to have reduced diameter at its laterally opposite ends. The bearing casing is formed at its inner surface with an annular groove faced to the above-mentioned stepped portions of the bearing casing. The spring means is placed between the groove and the stepped portions and comprises arcuate members, i.e., circumferentially equiangularly divided portions of cylinder. The arcuate member has outer projections in parallel with an axis and equiangularly spaced apart from each other to be at circumferentially opposite ends and at a midway portion. The arcuate member further has inner projections in parallel with the axis and each midway between the adjacent outer projections. The inner and outer projections of the members are contacted with the stepped portions of the bearing metal and support surfaces of the grooved inner bottom of the bearing casing, respectively, so that the bearing metal is supported by the bearing casing via the concentricity spring means to provide a gap between the outer periphery of the bearing metal and the inner surface of the bearing casing. Further, an oiling passage is communicated to the gap so as to generate oil film pressure as required.

Meritorious effects of the above bearing will be explained.

The bearing metal is supported by the support surface of the bearing casing via the projections on the concentricity spring means. As a result, a gap with a predetermined dimension is formed between the outer periphery of the bearing metal and the inner surface of the bearing casing. Oil is supplied into the gap to generate oil film pressure as required. The high rigidity of the spring means will assure the oil film since it prevent the surface of the bearing metal from being directly contacted with the inner surface of the bearing casing even when high vibrating or whirling force is applied on the shaft.

The spring means comprises circumferentially divided arcuate members which are slightly deformable by pressure of the bearing casing to be adapted well to the shape of the gap between the outer periphery of the stepped portion of the bearing metal and the support surface of the bearing casing which covers the bearing metal. As a result, close contact of the bearing metal and bearing casing with the inner and outer projections of the spring means can be maintained even when manufacturing accuracy may be somewhat low, and the bearing can be supported with high accuracy. Further, support of the bearing metal via the spring means can be achieved independently from and in parallel with support of the bearing metal via the oil film, so that an attenuating effect of the oil film can be estimated by calculation.

In the squeeze film damper bearing as described above, the spring means usually used comprises semi-circular members, and two of such spring members, i.e. upper and lower spring members, are used in combination. Each of the spring members has outer projections in parallel with the axis and provided at an apex and circumferentially opposite ends. The spring member further has inner projections in parallel with the axis and provided at 45° to the horizontal. Such spring members are produced by masking portions of a cylindrical body which correspond to the inner and outer projections as required and caving the other portions by etching. Then, the etched portions are formed in concave shape while the masked portions are formed in projected shape. The cylindrical body is, then, cut off along a plane passing through centers of the diametrically opposite outer projections and including the axis to thereby provide the spring members. The height of each of the projections may be in the order of several hundred µm.

As described above, the concentricity spring means used in the squeeze film damper bearing is produced by machining and etching from a thick cylindrical body, which results in higher material and fabricating cost. Moreover, dimensional restriction may make it difficult to vary the spring constant in wide range in accordance with operating conditions.

To solve the above problems in the prior art, it is an object of the present invention to provide a squeeze film damper bearing with concentricity spring means, which can be produced at low cost and in which spring constant can be varied in wide range.

BRIEF SUMMARY OF THE INVENTION

The present invention relates to a squeeze film damper bearing which comprises a bearing metal for supporting a rotation shaft, a bearing casing for covering the bearing metal and concentricity spring means between the bearing metal and the bearing casing, said bearing casing being provided at an inner periphery thereof with a circumferential groove for accommodating said spring means, said spring means being made of an elongate steel sheet and having a plurality of recesses formed on a surface of the steel sheet to thereby provide a plurality of longitudinally aligned projections on the other surface of said steel sheet, said steel sheet being bent into cylindrical shape, each of said projections having a curved surface with a generating line in parallel with said rotation shaft.

Preferably, the recesses of the concentricity spring means are formed on the inner surface of the steel sheet to provide the projections on the outer periphery of the steel sheet.

Meritorious effects of the invention will be described.

The inner periphery of the spring means accommodated in the groove of the bearing casing is contacted with the outer periphery of the bearing metal. The projections on outer periphery of the spring means are contacted at their tips with the bottom surface of the groove of the bearing casing. Thus, the bearing metal is elastically supported by the bearing casing via the concentricity spring means with a gap of a predetermined dimension being formed between the outer periphery of the bearing metal and the inner surface of the bearing casing. Oil is supplied to the gap to generate oil film pressure as required so that any vibration and whirling of the rotation shaft can be attenuated.

The concentricity spring means is produced by press-machining a surface of an elongate thin steel sheet to provide a plurality of longitudinally aligned projections on the other surface of the steel sheet and by bending the steel plate into cylinder. This results in reduction of material and manufacturing cost. Spring constant may be varied by varying thickness and/or width of the steel sheet, depth of the recesses (height of the projections) and/or the number of the recesses. Thus, the spring constant may be varied in wide range.

In the following, description will be given on an embodiment of the present invention referring to the attached drawings:

DETAILED DESCRIPTION OF THE PREFERRED EMBODIMENT

Figure 1:
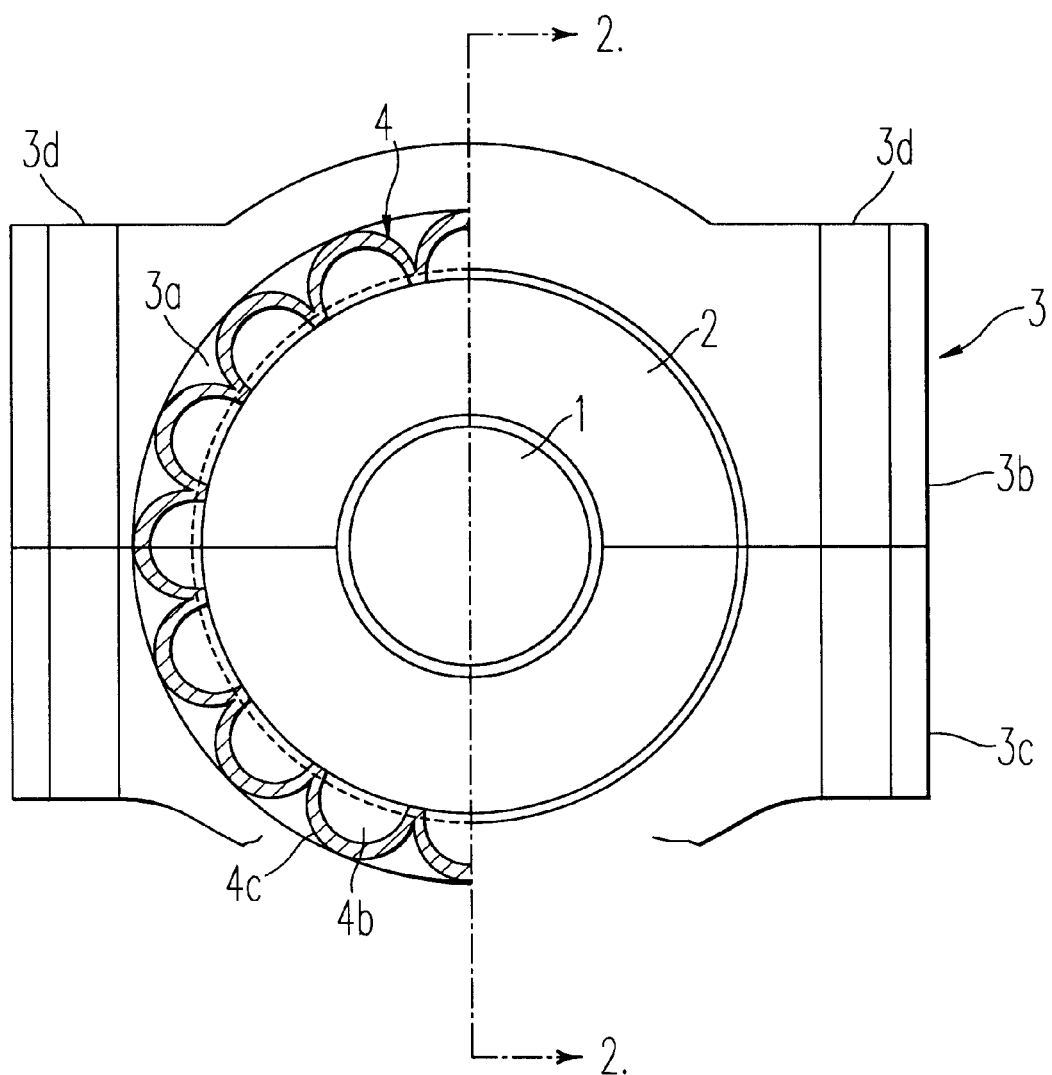
FIG. 1 is a front sectional view of a squeeze film damper bearing according to the invention in which shown on left and right halves are diagrams looking in the directions of arrows A—A and B—B in FIG. 2, respectively.
Figure 2:
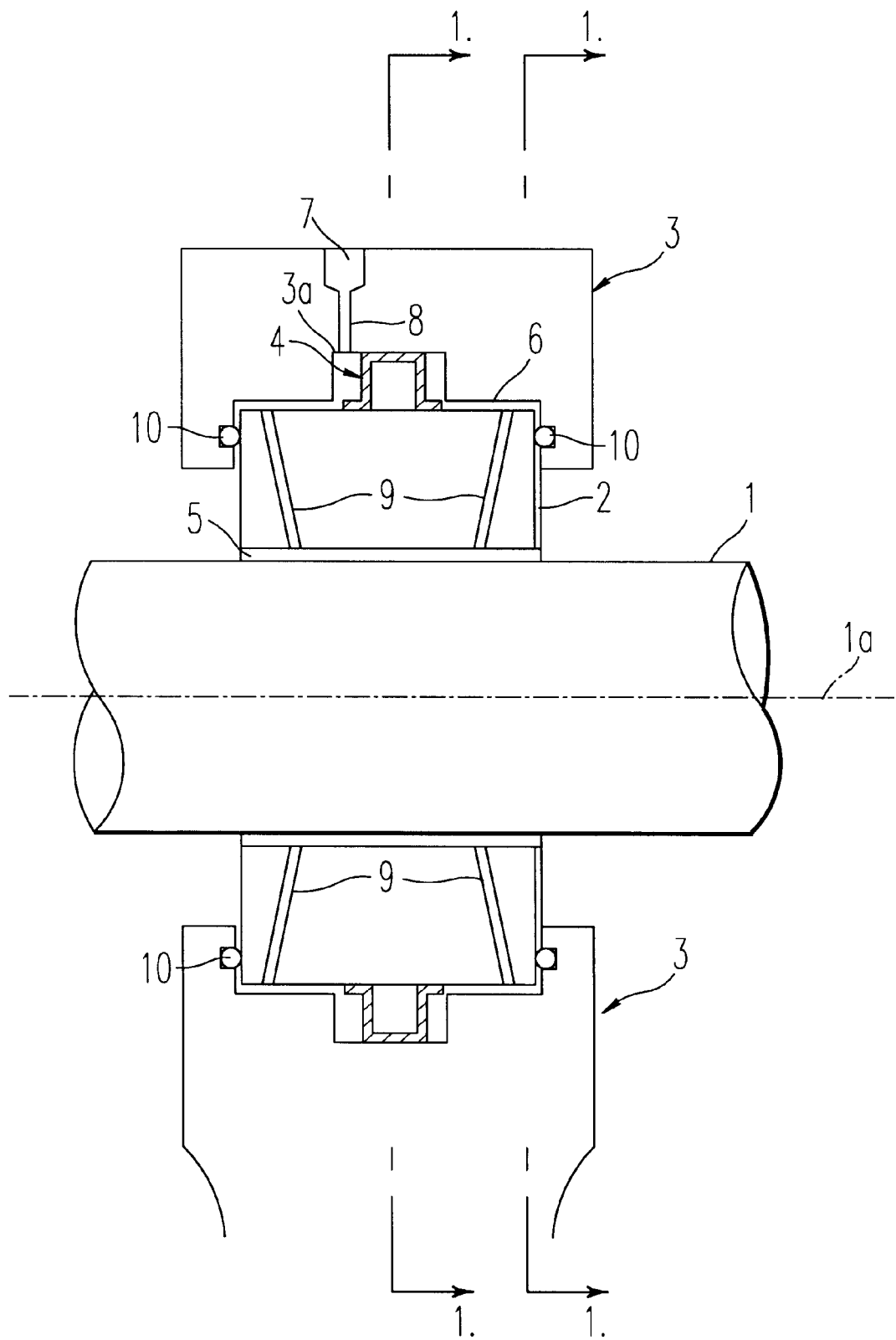
FIG. 2 is a sectional view looking in the direction of arrows C—C in FIG. 1.
Figure 3A:
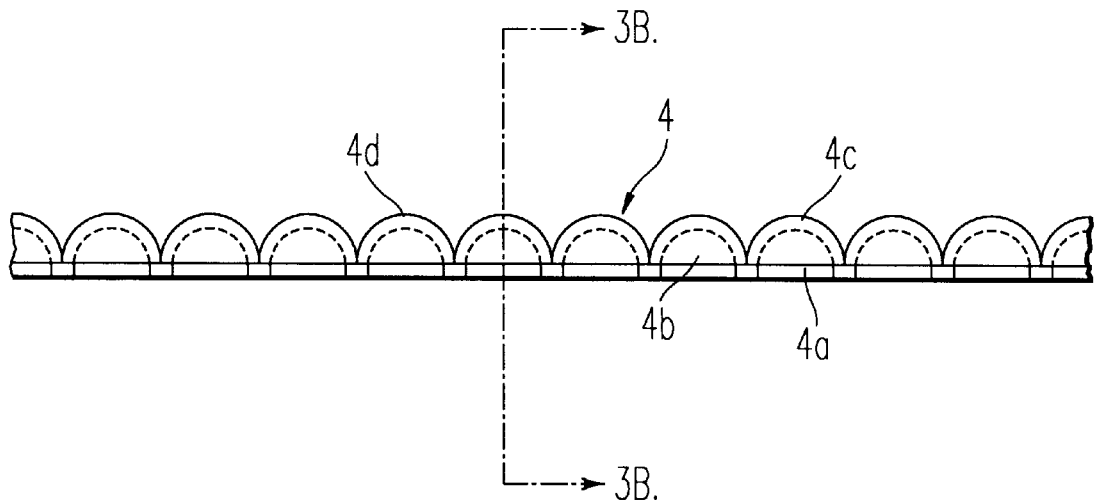
FIG. 3A is a side view of concentricity spring means under fabrication.
Figure 3B:
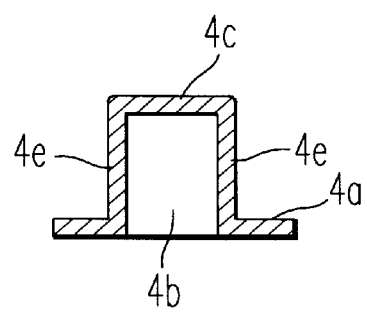
FIG. 3B is a view looking in the direction of arrows IIIB—IIIB in FIG. 3A.

In the drawings, reference numeral 1 represents a rotation shaft rotated around an axis 1a at 60,000 to 80,000 rpm and having diameter of about 20 to 30 mm; 2, a bearing metal which supports the shaft 1 via an oil film 5 and which has a diameter of about 60 to 80 mm and is divided into two parts; and 3, a bearing casing which covers an outer periphery of and opposite side surfaces of the bearing metal 2. The bearing casing 3 is provided at its inner periphery with a circumferential central groove 3a in which a concentricity spring 4 is accommodated. The bearing casing 3 comprises upper and lower casings 3b and 3c which are fastened and coupled together by bolts and nuts (not shown) penetrating through holes 3d.

The concentricity spring means 4 is made of an elongate stainless steel sheet 4a with thickness of 0.3 to 0.7 mm. Recesses 4b each being about 1 to 3 mm in depth are formed by press-machining a surface of the sheet 4a to provide a number of longitudinally aligned projections 4c on the other surface of the sheet 4a. The sheet 4a is, then, bent into cylindrical shape so that it covers the outer periphery of the bearing metal 2.

In this embodiment, the projections 4c has been shown to be semi-cylindrical; but this is not a requisite. It will suffice that each of the projections 4c has a curved surface 4d with a generating line being in parallel with the axis of the rotation shaft 1. The projections may be a shallower segment or may be designed in sine curve. Opposite sides of the curved surface 4d are closed by substantially semi-cylindrical flat sheets 4e.

Reference numeral 7 denotes an oiling port; 8, a narrow passage which communicates the port 7 with the groove 3a; 6, an oil film with thickness of about 0.1 to 0.2 mm to provide the squeeze film damper; 9, narrow passages which communicate the oil film 6 with the oil film 5; and 10, oil seals.

Meritorious effects of the embodiment will be described.

The inner periphery of the spring means 4 accommodated in the groove 3a of the bearing casing 3 is contacted with the outer periphery of the bearing metal 2. The projections 4c on the outer periphery of the spring means 4 are contacted at their tips with the bottom surface of the groove 3a of the bearing casing 3. Thus, the bearing metal 2 is elastically supported by the bearing casing 3 via the concentricity spring means 4 with the gap of about 0.1 to 0.2 mm being formed between the outer periphery of the bearing metal 2 and the inner surface of the bearing casing 3. Oil is supplied through the port 7 to the gap to generate the oil film 6 so that any vibration and whirling of the rotation shaft can be attenuated. The concentricity spring means 4 is produced by press-machining the surface of the elongate thin steel sheet 4a, which results in reduction of material and manufacturing cost. Spring constant may be varied in wide range by varying thickness and/or width of the steel sheet 4a and/or depth and/or the number of the recesses 4b.

It is to be understood that the present invention is not limited to the above embodiment and that various changes and modifications may be made without departing from the spirit and the scope of the invention. For example, the above-mentioned embodiment has the single concentricity spring means positioned at the lateral center of the bearing metal; alternatively, two spring means may be provided each at the respective lateral side edges of the bearing metal. In the embodiment, the single groove 3a is formed on the bearing casing 3; alternatively, the grooves 3a may be formed on the bearing casing 3 and the bearing metal 2, respectively. In the embodiment, the projections 4c are on outer periphery of the concentricity spring means 4; alternatively, it may be provided on the inner periphery of the spring means 4.

As described above, according to the squeeze film damper bearing of the invention, superb effects can be attained such as reduction in cost and changeability of the spring constant in wide range since the concentricity spring means is fabricated by press-machining an elongated steel sheet.

What is claimed is:

1. A squeeze film damper bearing which comprises a bearing metal for supporting a rotation shaft, a bearing casing for covering the bearing metal and concentricity spring means between the bearing metal and the bearing casing, said bearing casing being provided at an inner periphery thereof with a circumferential groove for accommodating said spring means, said spring means being made of an elongate steel sheet and having a plurality of recesses formed on a surface of the steel sheet to thereby provide a plurality of longitudinally aligned projections on the other surface of said steel sheet, said steel sheet being bent into cylindrical shape, each of said projections having a curved surface with a generating line in parallel with said rotation shaft.

2. The bearing accoarding to claim 1 wherein the recesses of the concentricity spring means are formed on the inner surface of the steel sheet to provide the projections on the outer periphery of the steel sheet.

* * * * *